(12) United States Patent
May et al.

(10) Patent No.: US 12,088,166 B2
(45) Date of Patent: Sep. 10, 2024

(54) STATOR OF A COOLANT DRIVE, ELECTRIC MOTOR, REFRIGERANT DRIVE AND METHOD OF PRODUCING A STATOR

(71) Applicant: Brose Fahrzeugteile SE & Co. Kommanditgesellschaft, Wuerzburg, Wuerzburg (DE)

(72) Inventors: Alexander May, Zellingen (DE); Duc Van Tong, Wuerzburg (DE); Stefan Portner, Randersacker (DE); Stefan Wuest, Lohr am Main (DE); Markus Rauch, Bamberg (DE)

(73) Assignee: Brose Fahrzeugteile SE & Co. Kommanditgesellschaft, Wuerzburg, Wuerzburg (DE)

(*) Notice: Subject to any disclaimer, the term of this patent is extended or adjusted under 35 U.S.C. 154(b) by 244 days.

(21) Appl. No.: 17/687,736

(22) Filed: Mar. 7, 2022

(65) Prior Publication Data

US 2022/0190668 A1    Jun. 16, 2022

Related U.S. Application Data

(63) Continuation of application No. PCT/EP2020/074450, filed on Sep. 2, 2020.

(30) Foreign Application Priority Data

Sep. 6, 2019    (DE) .................... 10 2019 213 616.8
Nov. 13, 2019   (DE) .................... 10 2019 217 540.6

(51) Int. Cl.
*H02K 3/52* (2006.01)
*B60H 1/32* (2006.01)
*H02K 15/00* (2006.01)

(52) U.S. Cl.
CPC ........... *H02K 3/522* (2013.01); *B60H 1/3226* (2013.01); *H02K 15/0062* (2013.01); *H02K 2203/09* (2013.01)

(58) Field of Classification Search
CPC ........ B60H 1/3226; H02K 3/52; H02K 3/522; H02K 15/0062; H02K 2203/09
(Continued)

(56) References Cited

U.S. PATENT DOCUMENTS

| 5,898,246 A | 4/1999 | Hoffman |
| 6,278,206 B1 | 8/2001 | Yockey et al. |

(Continued)

FOREIGN PATENT DOCUMENTS

| CN | 106787345 A | 5/2017 |
| DE | 202006012075 U1 | 12/2007 |

(Continued)

*Primary Examiner* — Rashad H Johnson
(74) *Attorney, Agent, or Firm* — Laurence A. Greenberg; Werner H. Stemer; Ralph E. Locher

(57) ABSTRACT

A stator contains a stator assembly having a number of stator teeth, which are provided with coils of a multi-phase stator winding, and a contact device for interconnecting axially orientated coil ends of the coils with a number of phase connections. The contact device has an interconnection ring fitted on the stator assembly on the end side and has integrated bus bars for interconnecting the coils with the phase connections. The contact device has a ring cover fitted on the interconnection ring. The interconnection ring has a number of axial through-openings corresponding to the number of coils ends, through which the coils ends are guided. The bus bars have contact tabs at the ends of the bar, which are arranged in a region of the through-openings, and on which a respective coil end is contacted. The ring cover covers the coil ends and contact tabs.

10 Claims, 8 Drawing Sheets

(58) Field of Classification Search
USPC .................................................. 310/71, 89
See application file for complete search history.

(56) References Cited

U.S. PATENT DOCUMENTS

| | | | |
|---|---|---|---|
| 8,772,988 B2* | 7/2014 | Vedy | H02K 3/38 |
| | | | 310/43 |
| 2008/0290978 A1 | 11/2008 | Yamamoto et al. | |
| 2012/0091837 A1 | 4/2012 | Bodenstein et al. | |
| 2012/0161555 A1 | 6/2012 | Sawada et al. | |
| 2014/0015349 A1* | 1/2014 | Chamberlin | H02K 3/345 |
| | | | 310/43 |
| 2015/0188376 A1* | 7/2015 | Yamaguchi | H02K 3/28 |
| | | | 310/71 |
| 2016/0186664 A1 | 6/2016 | Kirtley et al. | |
| 2016/0186665 A1 | 6/2016 | Johnson et al. | |
| 2020/0313502 A1* | 10/2020 | Guntermann | B60H 1/3222 |
| 2020/0343781 A1* | 10/2020 | An | H01R 25/16 |
| 2021/0249935 A1 | 8/2021 | Long et al. | |
| 2021/0293253 A1 | 9/2021 | Chavez et al. | |
| 2021/0293254 A1 | 9/2021 | Chavez et al. | |
| 2021/0384789 A1 | 12/2021 | Mawatari et al. | |
| 2022/0190668 A1* | 6/2022 | May | H02K 15/0062 |

FOREIGN PATENT DOCUMENTS

| | | |
|---|---|---|
| DE | 102015201218 A1 | 7/2016 |
| DE | 102016223576 A1 | 5/2018 |
| DE | 102016223839 A1 | 5/2018 |
| EP | 2159425 A2 | 3/2010 |
| JP | 2013198312 A | 9/2013 |
| JP | 2018033197 A | 3/2018 |
| WO | 2019088424 A1 | 5/2019 |

* cited by examiner

STATOR OF A COOLANT DRIVE, ELECTRIC MOTOR, REFRIGERANT DRIVE AND METHOD OF PRODUCING A STATOR

CROSS-REFERENCE TO RELATED APPLICATION

This application is a continuation, under 35 U.S.C. § 120, of copending International Patent Application PCT/EP2020/074450, filed Sep. 2, 2020, which designated the United States; this application also claims the priority, under 35 U.S.C. § 119, of German Patent Application DE 10 2019 213 616.8, filed Sep. 6, 2019, and DE 10 2019 217 540.6 filed Nov. 13, 2019; the prior applications are herewith incorporated by reference in their entirety.

FIELD AND BACKGROUND OF THE INVENTION

The invention relates to a stator of an electric motor, having a stator stack with a number of stator teeth which are provided with coils of a multiphase stator winding, and a contact apparatus for interconnecting axially directed coil ends of the coils with a number of phase connectors. Furthermore, the invention relates to a refrigerant drive with a stator of this type, and to a method for producing a stator of this type.

In the case of motor vehicles, air conditioning systems are frequently installed which control the climate of the vehicle interior compartment with the aid of a system which forms a refrigerant circuit. Systems of this type fundamentally have a circuit, in which a refrigerant is conducted. The refrigerant, for example R-134a (1,1,1,2-tetrafluroethane) or R-744 (carbon dioxide), is heated on an evaporator and compressed by a (refrigerant) compressor, the refrigerant subsequently outputting the absorbed heat again via a heat exchanger before it is again conducted to the evaporator via a throttle.

In applications of this type, for example, scroll-type machines as compressors for the refrigerant are fundamentally possible. Scroll-type compressors of this type typically have two scroll parts which can be moved relative to one another and, during operation, work in the manner of a positive displacement pump. Here, the two scroll parts are typically configured as a (worm-shaped) spiral or scroll pair which is nested. In other words, one of the spirals engages at least partially into the other spiral. Here, the first (scroll) spiral is stationary in relation to a compressor housing (stationary scroll, fixed scroll), the second (scroll) spiral (movable scroll, orbiting scroll) being driven in an orbiting manner within the first spiral by an electric motor.

In the case of refrigerant drives of this type which are electric or are driven by electric motor, the electric motors and the (motor) electronics are cooled by what is known as a suction gas (refrigerant). Reliable cooling of the electronics and the electric motor is central here for reliable and dependable operation and for long term performance of the refrigerant compressor. Here, in particular, the electronics typically have a high thermal sensitivity, with the result that reliable cooling is necessary. Here, the cold suction gas is as a rule conducted to a bulkhead which adjoins the electronics and through the electric motor.

The refrigerant drive as a rule has a drive housing with an inlet (suction gas port connector, suction port), through which the suction gas or refrigerant flows as a fluid into the interior of the drive housing, and therefore to the electric motor.

An electric motor which is, in particular, brushless as an electric (three-phase) machine usually has a stator which is provided with a multiphase rotating-field winding or stator winding and is arranged coaxially with respect to a rotor with one or more permanent magnets. Both the rotor and the stator are configured, for example, as laminated cores, stator teeth in stator grooves which lie in between supporting the coils of the stator winding.

The coils are for their part usually wound from an insulated wire, and are assigned to individual cords or phases of the electric motor or refrigerant drive, and are interconnected among one another in a predefined way by means of a stator end-side contact apparatus.

In order to guide and to interconnect the coil ends, the contact apparatus is as a rule configured as an interconnection system or connection unit which is placed onto the stator or onto a stator stack on the end side. Contact apparatus of this type serve, in particular, to connect, in an electrically conducting manner, the coil ends of the winding wire sections which form the coil windings, with the result that individual coil ends are short-circuited electrically with one another, and therefore the coil windings or phase windings can be energized in series. The interconnected stator winding is actuated by the motor electronics, in order to generate the rotating field which brings about a torque on the permanently excited rotor.

For the connection or contacting of the coil ends, contact apparatuses of this type frequently have a number of integrated or overmolded conductor tracks or busbars as connecting conductors. During the assembly of the electric motor or stator, the coil ends are contacted with the busbars, with the result that coil windings which are assigned to a common phase are short-circuited with one another via the contact apparatus.

In order to avoid electrical short circuits between the phases and for general personal protection, it is necessary that the electric contacts or contact points between the busbars and the coil ends are electrically insulated with respect to the suction gas.

SUMMARY OF THE INVENTION

The invention is based on the object of specifying a particularly suitable stator of a refrigerant drive. In particular, a stator is to be specified, in the case of which the electric contact points between a stator winding and a contact apparatus are electrically insulated reliably and dependably with respect to a suction gas. Furthermore, the invention is based on the object of specifying a particularly suitable electric motor and a particularly suitable refrigerant drive, and a particularly suitable method for producing a stator.

According to the invention, the object with regard to the stator is achieved by way of the features of the independent stator claim, the object with regard to the electric motor is achieved by way of the features of the independent electric motor claim the object with regard to the refrigerant drive is achieved by way of the features of the independent refrigerant drive claim, and the object with regard to the method is achieved by way of the features of the independent method claim. Advantageous refinements and developments are the subject matter of the subclaims.

The stator according to the invention is provided, and is suitable and configured, for an electric motor. Here, in particular, the stator is part of an electric motor of an electric refrigerant drive. The stator has a stator stack with a number of stator teeth which are provided or fitted with coils of a multiphase stator winding. Here, the coils in each case have a first and second coil end, which are directed approximately axially. Here, the coil ends are interconnected by a contact apparatus with a number of phase connectors which corresponds to the number of phases.

The contact apparatus has an interconnection ring as connecting unit which is placed onto the stator stack on the end side and has integrated busbars for interconnecting the coils or coil ends with the phase connectors. A ring cover, as covering plate, is placed axially onto the interconnection ring. A number of axial leadthrough openings which corresponds to the number of coil ends are made in the interconnection ring, through which leadthrough openings the coil ends are led through perpendicularly at least in sections.

The busbars of the interconnection ring are provided on the bar end side with contact tabs which are arranged in the region of the leadthrough openings and to which in each case one coil end is contacted or is connected in an electrically conducting manner. The contacting of the coil ends with the busbars takes place, for example, by an integrally joined connection, in particular by soldering or welding.

An "integral joint" or an "integrally joined connection" between at least two parts which are connected to one another is understood here and in the following text to mean, in particular, that the parts which are connected to one another are held together on their contact faces by way of material combination or cross-linking (for example, on the basis of atomic or molecular binding forces), possibly with the action of an additive.

According to the invention, the contact points between the coil ends and the contact tabs are covered by the ring cover. Here, a cavity which is configured between the ring cover and the interconnection ring is filled with an electrically insulating potting material. As a result, a particularly suitable stator of a refrigerant drive is realized, in the case of which the electric contact points between the stator winding and the contact apparatus are electrically insulated reliably and dependably with respect to a suction gas.

Here, an electrically insulating potting material is to be understood to mean, in particular, a cast resin with electrically insulating properties. The potting material is, for example, an epoxy, polyurethane or silicone material.

Here, the cavity is preferably filled completely with the potting material, with the result that a particularly high layer thickness is realized. As a result, high electric field strengths between the contact points are insulated reliably and simply. Furthermore, the contact points are sealed reliably with respect to the suction gas, in particular with respect to refrigerant and/or oil, by way of the potting. Here and in the following text, the conjunction "and/or" is to be understood in such a way that the features linked by means of this conjunction can be configured both jointly and as alternatives to one another.

The contact apparatus, in particular the interconnection unit and/or the ring cover, are produced as injection molded parts from a plastic material. As a result, a particularly simple and inexpensive production of the contact apparatus and therefore of the stator is made possible.

Here and in the following text, "axial" or an "axial direction" is understood to mean, in particular, a direction parallel (coaxial) with respect to the rotational axis of the electric motor, that is to say perpendicularly with respect to the end sides of the stator. Correspondingly, here and in the following text, "radial" or a "radial direction" is understood to mean, in particular, a direction which is oriented perpendicularly (transversely) with respect to the rotational axis of the electric motor along a radius of the stator or the electric motor. Here and in the following text, "tangential" or "tangential direction" is understood to mean, in particular, a direction along the circumference of the stator or the electric motor (circumferential direction, azimuthal direction), that is to say a direction perpendicularly with respect to the axial direction and with respect to the radial direction.

In one advantageous embodiment, the ring cover is joined in a positively locking and/or non-positive manner to the interconnection ring. As a result, reliable and simple fastening of the ring cover to the interconnection ring is realized.

Here and in the following text, a "form fit" or "form-locking connection" between at least two parts which are connected to one another is understood to mean, in particular, that the cohesion of the parts which are connected to one another is brought about at least in one direction by way of direct engaging of contours of the parts themselves into one another or by way of indirect engagement via an additional connecting part. The "blocking" of a mutual movement in this direction therefore takes place in a manner due to shape.

Here and in the following text, a "frictional fit" or "force-locking connection" between at least two parts which are connected to one another is understood to mean, in particular, that the parts which are connected to one another are prevented from sliding off one another on account of a frictional force which acts between them. If a "connecting force" which brings about this frictional force (this means that force which presses the parts against one another, for example a bolt force or weight itself) is absent, the force-locking connection cannot be maintained and can therefore be released.

In one possible embodiment, the ring cover is provided with a number of radially directed latching tongues which project radially or perpendicularly from the outer circumference of the ring cover. Here, in particular for the form-locking and/or force-locking fastening of the ring cover to the interconnection ring, the latching tongues are clipped or can be clipped or are latched or can be latched at least in sections in corresponding latching receptacles of the interconnection ring. Particularly simple and reliable mounting of the ring cover is made possible as a result.

In one expedient embodiment, the cavity is sealed here in a fluid-tight manner. This means that a fluid-tight connection is realized between the interconnection ring and the ring cover. As a result, it is ensured that the contact points do not come into contact with the suction gas.

In one expedient embodiment, the cavity is sealed here in a fluid-tight manner with respect to the interconnection ring by means of two annular seals of the ring cover. Here, the annular seals which are oriented, in particular, axially in the direction of the interconnection ring are arranged firstly on an outer circumference and secondly circumferentially around a central ring opening of the ring cover. As a result, the cavity and therefore the contact points are protected reliably and simply against contact with refrigerant and/or oil.

In one alternative embodiment, it is conceivable, for example, that the ring cover is joined in an integrally joined fluid-tight manner to the interconnection ring. Here, the ring cover is joined to the interconnection ring, for example, by means of welding, in particular by means of ultrasonic or laser welding, or by means of an adhesive bond.

An additional or further aspect provides that the ring cover is provided with at least one deflection contour which conducts a fluid, in particular the suction gas, which flows into the refrigerant drive into a central ring opening of the contact apparatus. Here, the ring opening is arranged so as to be flush axially with the central stator opening, with the result that the inflowing suction gas is introduced through the ring cover reliably and simply into the stator. Here, in particular, the flow resistance of the inflowing fluid is advantageously reduced in comparison with an embodiment without a deflection contour.

In one preferred embodiment, the deflection contour is formed as a number of ramps which are directed radially and open axially toward the ring opening. Here the ramps are integrally formed radially on the inside on the ring cover. Here, for example, the deflection contour has a number of ramps which corresponds to the number of stator teeth. As a result, a particularly suitable deflection contour is realized.

The electric motor according to the invention is configured, in particular, as an electric drive of a refrigerant compressor, for example of a scroll-type compressor, of a motor vehicle. Here, the electric motor has an above-described stator and a rotor which is mounted rotatably therein. The advantages and embodiments which are stated with regard to the stator can also be transferred mutatis mutandis to the electric motor, and vice versa.

The refrigerant drive according to the invention is configured, in particular, as a refrigerant compressor, for example as an electric motor scroll-type compressor, of a motor vehicle. Here, the refrigerant drive has an electric motor with an above-described stator. The advantages and embodiments which are stated with regard to the stator and/or the electric motor can also be transferred mutatis mutandis to the refrigerant drive, and vice versa.

The method according to the invention is provided, and is suitable and configured, for producing an above-described stator. In accordance with the method, first of all the interconnection ring of the contact apparatus is placed onto the stator stack which is wound with the stator winding, and the coil ends are guided axially through the leadthrough openings here. Subsequently, the coil ends are contacted to the associated contact tabs. Afterward, the ring cover is placed onto the contacted coil ends and contact tabs. Finally, the cavity which is configured between the ring cover and the interconnection ring is filled substantially completely with an electrically insulating potting material, and the potting material is hardened to form a potting. As a result, a particularly simple method for producing the stator is realized.

The advantages and embodiments which are stated with regard to the stator and/or the refrigerant drive and/or the electric motor can also be transferred mutatis mutandis to the method, and vice versa.

In one advantageous development, after the ring cover is placed onto it, the stator is rotated in such a way that the stator end side which is provided with the contact apparatus faces a substrate. Subsequently, the potting material is filled via the leadthrough openings into the cavity. This means that the ring cover therefore acts as a potting cap, that is to say as a filling mold for the potting material, of the contact apparatus. Particularly simple and complete filling of the cavity is made possible due to gravity by way of the rotation of the stator during filling of the potting material; in particular, enclosed air pockets or the like are avoided simply and with little outlay in this way. As a result, full or complete filling of the cavity with the potting material is ensured.

Other features which are considered as characteristic for the invention are set forth in the appended claims.

Although the invention is illustrated and described herein as embodied in a stator of a coolant drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and variables which correspond to one another are always provided with the same designations in all the figures.

Figure 1:
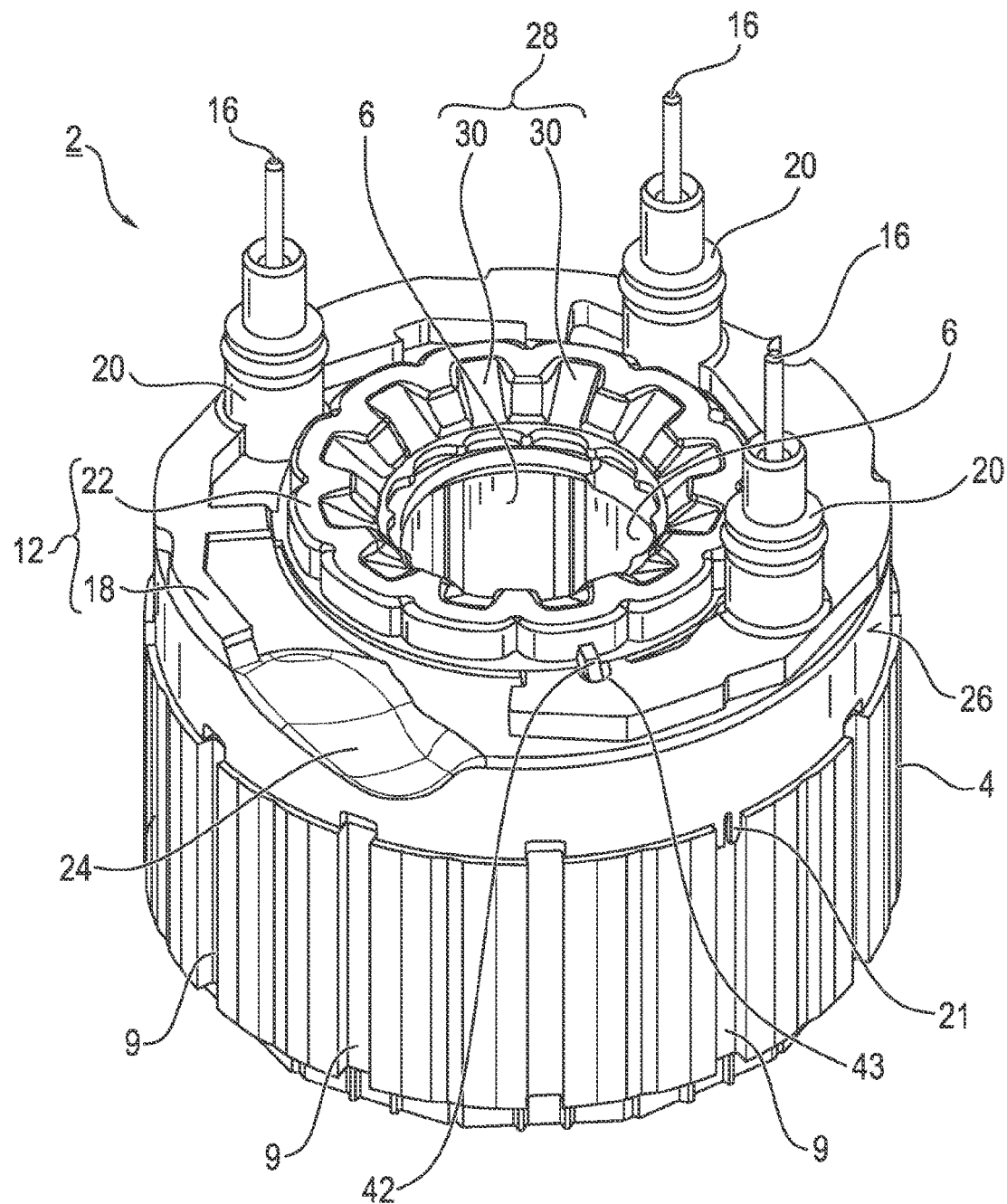
FIG. 1 is a diagrammatic, perspective view of a stator of a refrigerant drive, with a stator stack and with a contact apparatus which is placed onto it, and according to the invention.
Figure 8:
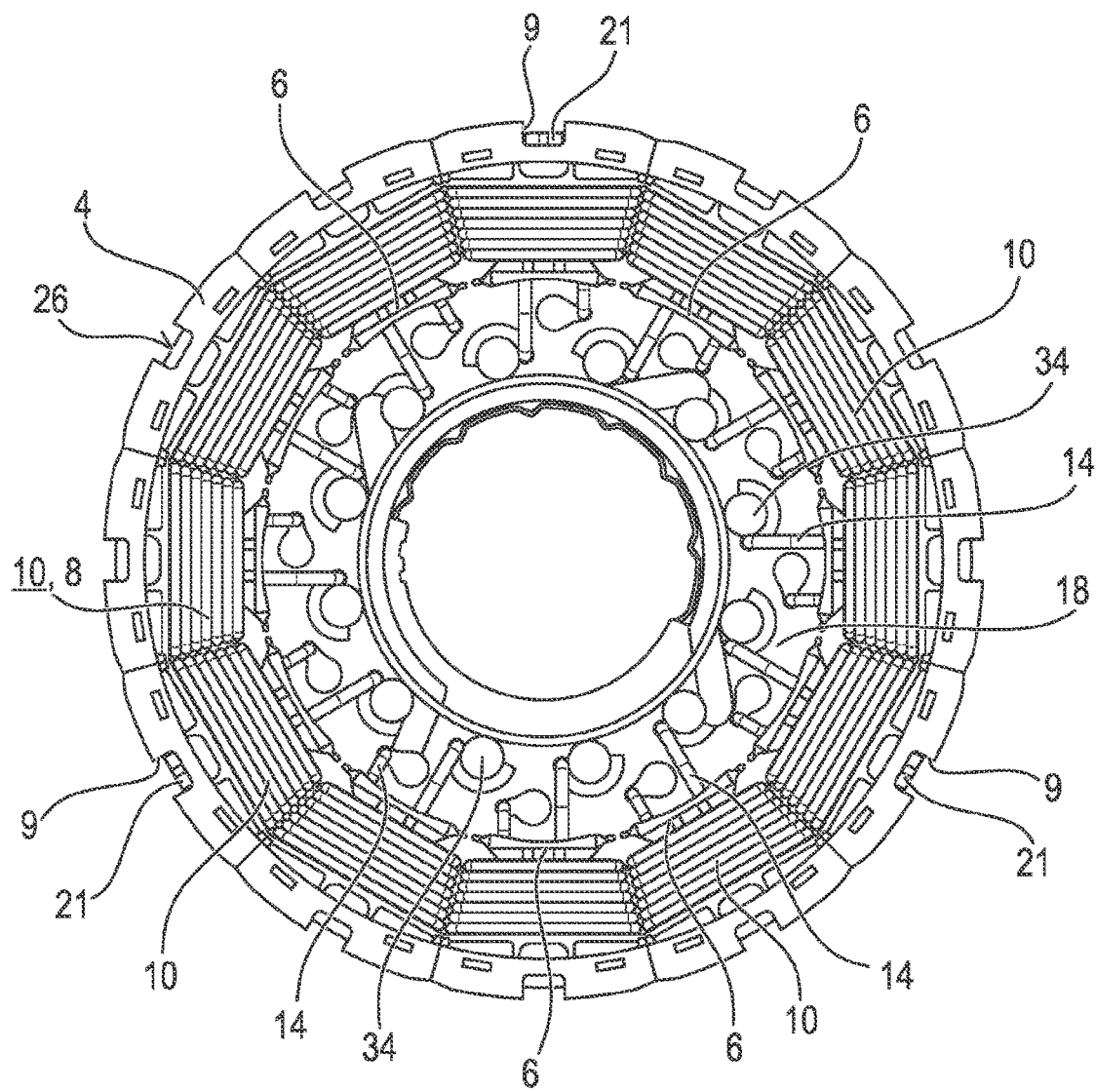
FIG. 8 is a top view of the stator with a view of an underside of the contact apparatus.

Referring now to the figures of the drawings in detail and first, particularly to FIG. 1 thereof, there is shown shows a stator 2 according to the invention. In a suitable application, the stator 2 is part of an electric motor of a refrigerant drive (not shown in greater detail), in particular of a refrigerant compressor of a motor vehicle. The stator 2 has a stator stack 4 with twelve inwardly directed stator teeth 6, to which a stator winding or rotating-field winding 8 (FIG. 8) is applied. The stator stack 4 is provided on the outer side with a number of axially running grooves 9.

The coil windings are wound as coils 10, in particular as individual coils, for example onto insulating winding supports or coil supports, and are placed with the latter onto the stator teeth 6 of the stator stack 4. Here, each of the frame-like winding supports, supports a coil 10 or coil winding as part of the stator winding 8.

The coil ends of the (individual) coils 10 are interconnected by means of a contact apparatus 12 which is placed on the end side onto the stator 2 or onto the stator stack 4 to form the three-phase stator winding or rotating-field winding 8 in this exemplary embodiment. In electric motor operation, the energized windings of the stator coil 8 generate a stator-side magnetic field which interacts with permanent magnets of a rotor, rotating about a central stator or motor axis, of a brushless electric motor.

Here, the coil ends 14 (FIG. 8) of the coils 10 are interconnected to form the phases or phase windings, each phase having a phase connector 16. Here, the interconnection of the coil ends 14 takes place, in particular, in an interconnection ring 18 as main body or connecting unit of the contact apparatus 12. The coils 10 and coil ends 14 are provided with designations in the figures merely by way of example.

The phases of the stator winding 8 are interconnected, for example, in a star or delta connection. In this exemplary embodiment, the stator 2 is, in particular, of three-phase configuration, and therefore has three phase ends or phase connectors 16. The phase ends 16 are provided in each case with a sleeve-like or cuff-like plated-through hole 20 which, in the assembled state, leads the respective phase connector 16 in a sealing, in particular pressure-tight and gas-tight, and electrically insulated manner through a housing intermediate wall or bulkhead to associated motor electronics.

The contact apparatus 12 is fastened or can be fastened to the stator stack 4 in a form-locking and/or force-locking manner by means of axial latching tongues 21 of the interconnection ring 12. The three latching tongues 21 are arranged distributed circumferentially on an end side of the interconnection ring 18, which end side faces the stator stack 4. Here, the stator stack 4 has the grooves 9 which run axially on its outer circumference and are provided merely by way of example with designations in the figures, and into which the latching tongues 21 engage in a clamping manner for fastening purposes. The contact apparatus 12 is therefore latched or fastened by clamping on the stator stack 4 such that it can be released without destruction.

In the following text, the contact apparatus 12 is explained in greater detail on the basis of FIGS. 2 to 11.

The contact apparatus 12 is of two-part configuration with the radially outer-side, annular interconnection ring 18 and a radially inner-side, annular ring cover 22 as inner body or covering plate.

Figure 2:
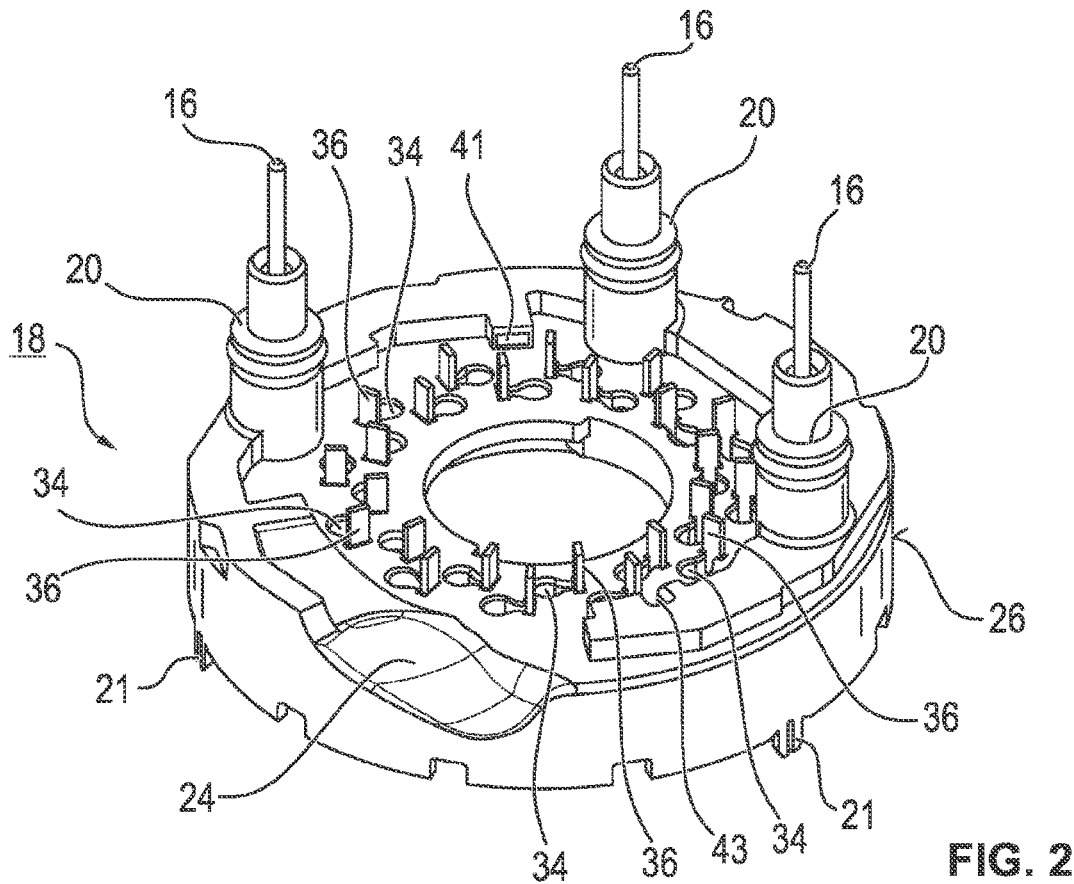
FIG. 2 is a perspective view of an interconnection ring of the contact apparatus.
Figure 3:
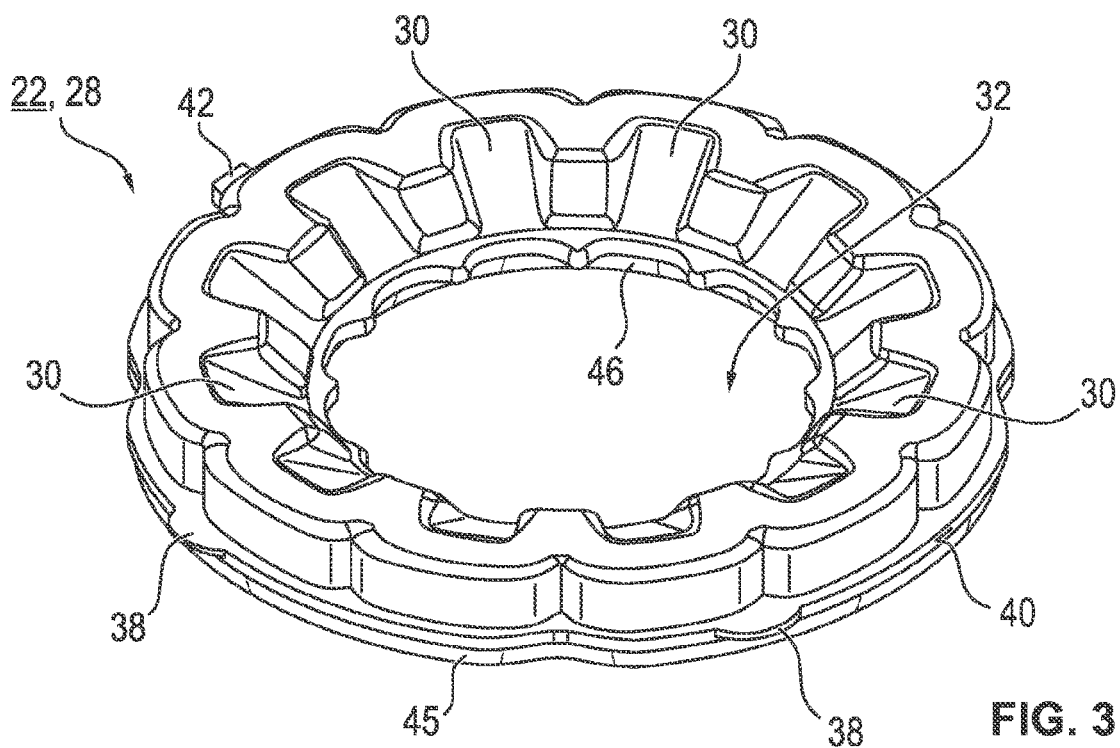
FIG. 3 is a perspective view of a ring cover of the contact apparatus with a view of an upper side.
Figure 4:
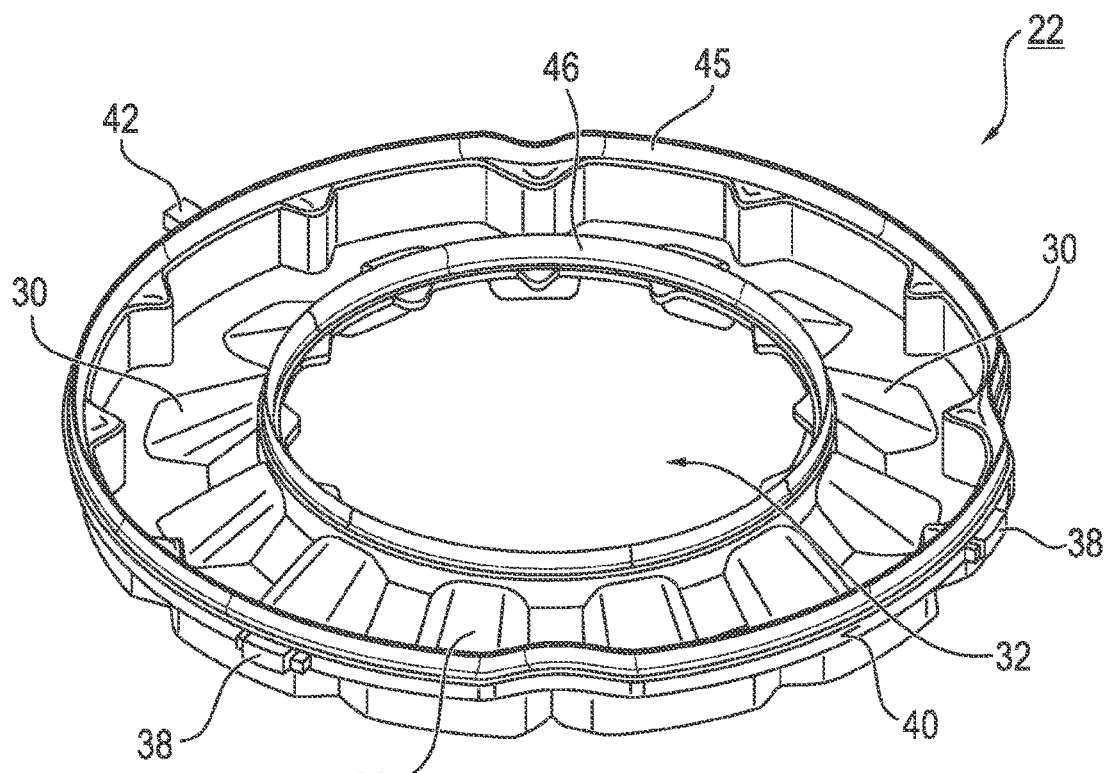
FIG. 4 is a perspective view of the ring cover of the contact apparatus with a view of an upper side.
Figure 5:
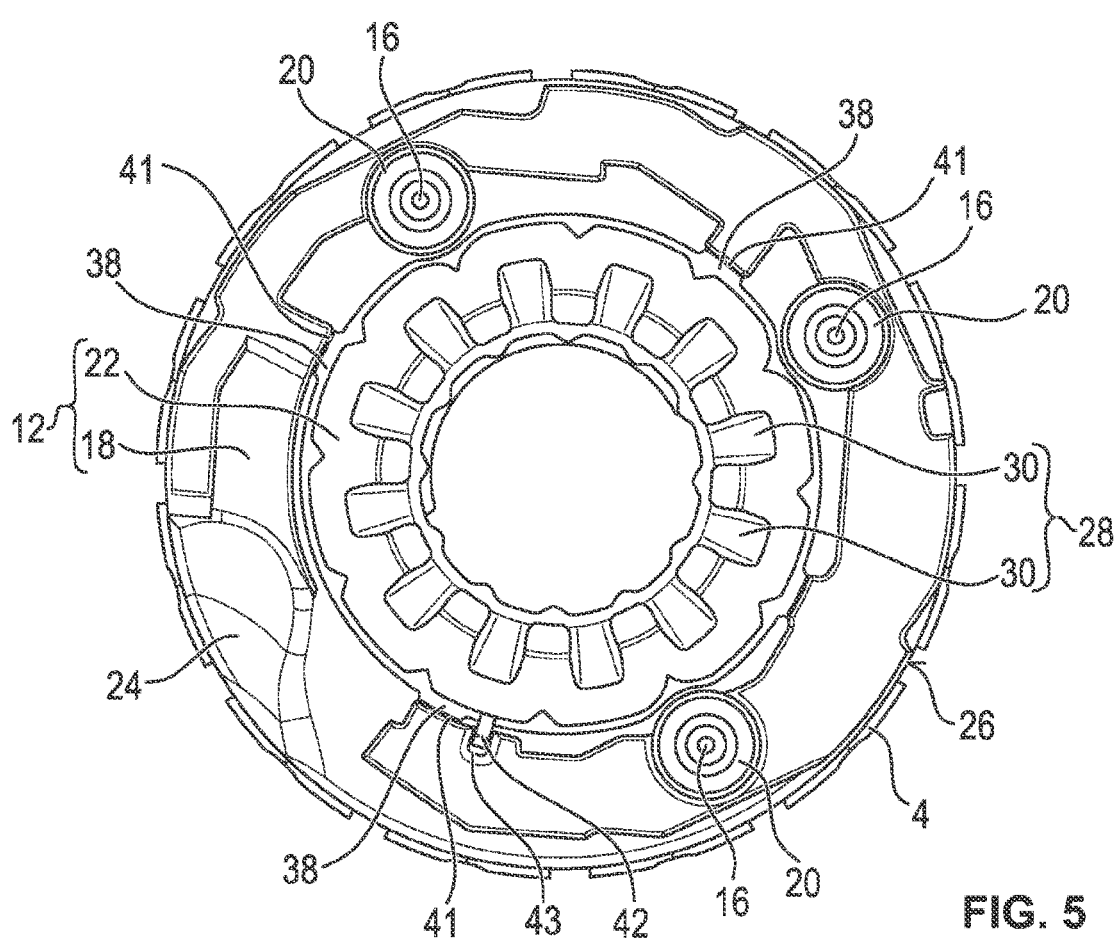
FIG. 5 is top view of the contact apparatus.
Figure 6:
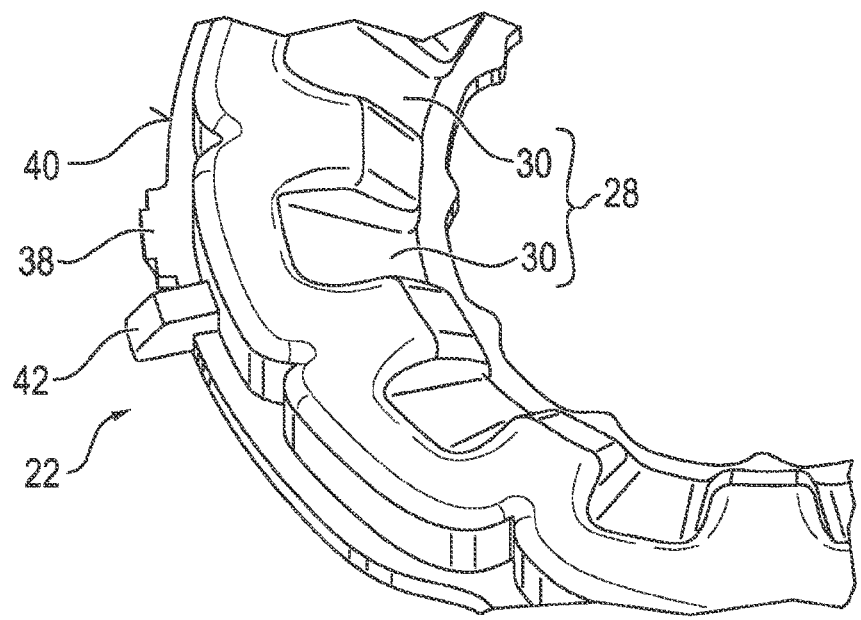
FIG. 6 is a partial, perspective view of the ring cover with a view of a latching tongue.

By means of the interconnection ring 18 which is shown individually in FIG. 2, the coil ends 14 are interconnected with one another and guided to the phase connectors 16, the interconnection or contacting of the coil ends 14 of the coils 10 taking place in the radially inner-side region, onto which the ring cover 22 which is shown individually in FIGS. 3 and 4 is placed or can be placed as a cover and in order to protect the contacted coil ends 14.

The interconnection ring 18 has a deflection region 24 which is made as a crescent-like depression, that is to say as a recess or indentation, in an outer circumference 26 of the contact apparatus 12 or of the interconnection ring 18.

In the assembled state, the deflection region 24 is expediently arranged in the region of an inlet of the refrigerant compressor, with the result that a fluid or suction gas which flows in radially through it impinges on the deflection region 24 of the contact apparatus 12. The deflection region 24 has a course which is radial and tangential and tapers spirally approximately in the radially inward direction.

Here, the deflection region 24 which faces the inlet is retracted axially in relation to an end side of the contact apparatus 12, which end side has the phase connectors 16. This means that the deflection region 24 is made in the contact apparatus 12 in an oblique or inclined manner with respect to an axial direction.

By way of the deflection region 24, the inflowing suction gas is deflected or guided spirally radially to the inside in a gentle manner, that is to say substantially without eddys or turbulences of its mass flow. Here, the deflection region 24 is preferably as far as possible of smooth and planar configuration, in order that the suction gas which flows or is guided along on it is not swirled. Suction pressure losses in the inflow or inlet region of the refrigerant drive are reduced by way of the deflection region 24. In other words, the contact apparatus 12 is configured by way of the deflection region 24, in particular, as a flow-improving component in the interior of a drive housing.

Therefore, the suction gas which is guided as a result to the electronics-side end side of the electric motor flows past a housing intermediate wall or bulkhead, and therefore first cools the motor electronics. Second, the suction gas flows along the axial direction through the electric motor, that is to say, in particular, through the clearance or gap region between the rotor and the pole shoe-side ends of the stator teeth 6 of the stator 2 or of the stator stack 4, as a result of which, for example, the energized coil windings 10 are cooled. As a result, in particular, the performance and the service life of the refrigerant drive are improved.

In order to improve the flow properties, that is to say in order to guide or conduct the mass flow of the suction gas from the deflection region 24 along the axial direction into the stator stack 4, the ring cover 22 has a deflection contour 28 in the form of twelve ramps 30 which are arranged distributed on an inner circumference of the ring cover 22. The ramps 30 are provided with designations in the figures merely by way of example. The ramps 30 are directed radially and are configured so as to open axially toward a central ring opening 32 of the ring cover 22.

Figure 10:
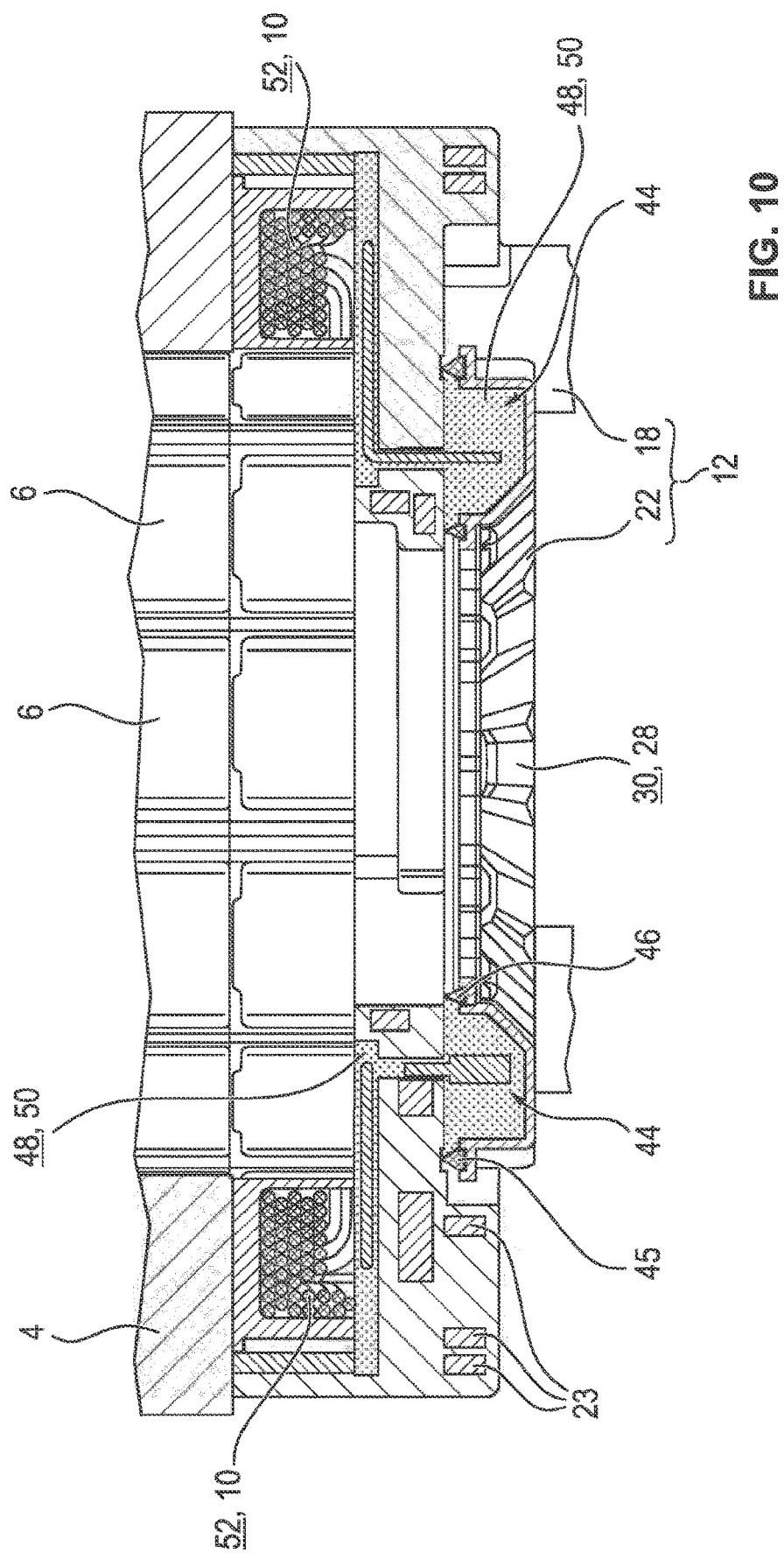
FIG. 10 is a sectional view of the stator taken along sectional line X-X in FIG. 9.

FIG. 2 shows the interconnection ring 18 with a ring cover 22 which is removed or has not been placed on top. The interconnection ring 18 has a number of busbars 23 which are integrated or embedded into the interconnection ring 18 (FIG. 10). By means of the busbars 23, the coil ends 14 are interconnected with one another and with the phase connectors 16 internally in a predefined way.

Figure 7:
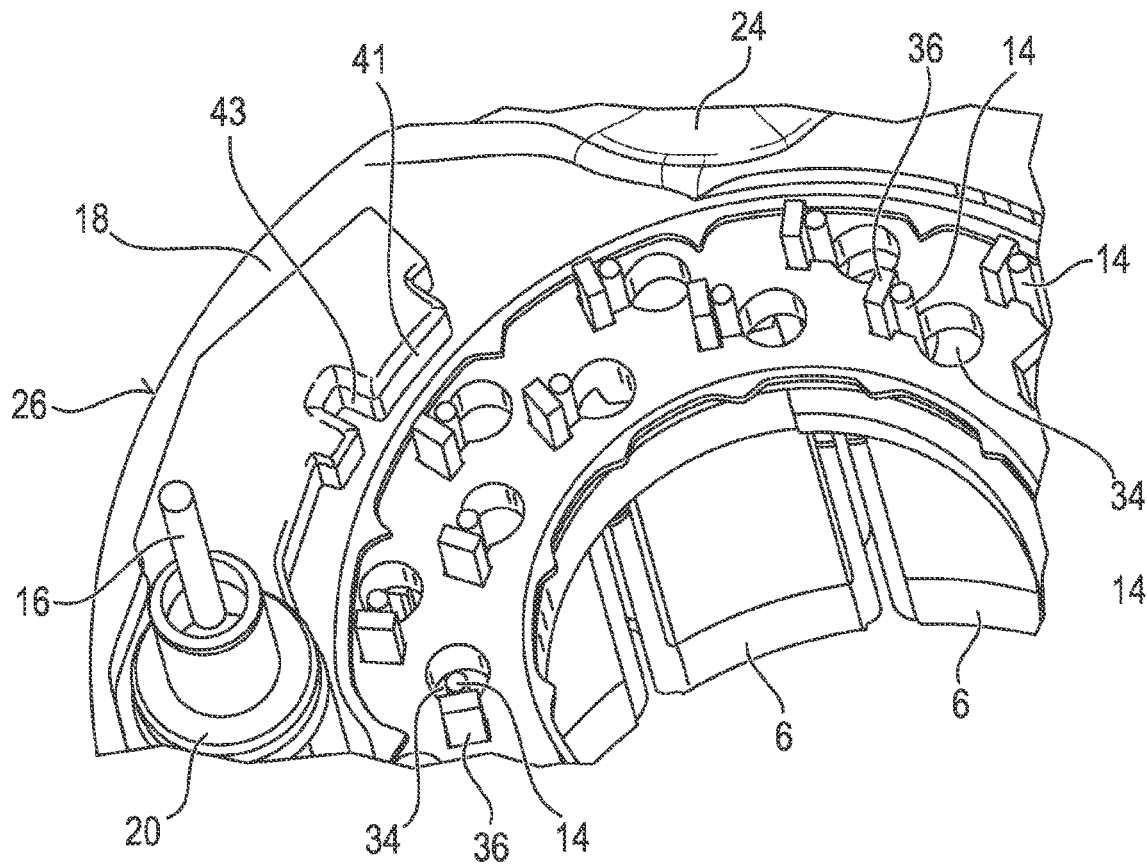
FIG. 7 is a partial, perspective view of the interconnection ring with a view of a latching receptacle.

As can be seen comparatively clearly in the illustration of FIG. 7, the coil ends 14 of the coils 10 can be led through radially inner-side, axial leadthrough openings 34, and can be contacted with contact tabs 36 of the busbars 23 on the upper side of the interconnection ring 12. Here, the contact tabs 36 are integrally formed, in particular, at the busbar ends of the busbars 23. For example, the coil ends 14 are welded to the contact tabs 36 in an integrally joined manner. The leadthrough openings 34 and contact tabs 36 are provided with designations in the figures merely by way of example.

The leadthroughs or leadthrough openings 34 are arranged on the inner circumference of the interconnection ring 12 distributed along an inner circular ring and an outer circular ring, the leadthrough openings 34 of the circular rings which are not denoted in greater detail being arranged offset with respect to one another. As can be seen, for example, in FIG. 5, the distribution pattern of the leadthrough openings 34 is adapted to the respective circumferential positions of the coil ends 14 of the stator 2. Here, the coil ends 14 are guided on an underside of the interconnection ring 12 approximately radially with respect to the respective associated leadthrough opening 34.

After the contacting, the coil ends 14 and the contact tabs 36 are covered by way of the ring cover 22. For dependable and reliable covering of the contacted coil ends 14 and contact tabs 36, the ring cover 22 is preferably joined to the interconnection ring 12 in a mechanically fixed and fluid-tight manner.

The ring cover 22 is preferably joined to the interconnection ring 12 in a form-locking and/or force-locking manner. As can be seen, in particular, in FIGS. 5 to 7, the ring cover 22 in this embodiment has three latching tongues 38 which are arranged distributed on the circumferential side, are directed approximately radially, and which project perpendicularly or radially from an outer circumference 40 of the ring cover 22. Here, the latching tongues 38 are latched or can be latched at least in sections in corresponding latching receptacles 41 of the interconnection ring 18 in order to fasten the ring cover 22 to the interconnection ring 18. To this end, the ring cover 22 is placed approximately axially onto the interconnection ring 18, and the approximately rectangular latching tongues 38 are clipped here to the corresponding latching receptacles 41. Furthermore, the ring cover 22 has a radial projection 42 as positioning aid, which projection 42 engages into a corresponding receiving contour of the interconnection ring 43.

As can be seen in FIG. 4, in particular, the ring cover 22 is of internally hollow configuration. This means that, in the joined state, an approximately annular cavity (annular space) 44 is configured between the interconnection ring 18 and the ring cover 22 (FIG. 10), in which cavity 44 the coil ends 14 and contact tabs 36 are arranged.

Here, in the joined state, the cavity 44 is sealed in a fluid-tight manner with respect to the interconnection ring 12 by means of two annular seals 45, 46 of the ring cover 22. Here, the annular seals 45 and 46 are arranged on the ring cover 22 in an axially oriented manner. Here, the radially outer-side annular seal 45 is arranged so as to run around the outer circumference 40 of the ring cover 22. The radially inner-side annular seal 46 is arranged so as to run around the ring opening 32. In other words, the cavity 44 is delimited radially by means of the annular seals 45 and 46.

Figure 11:
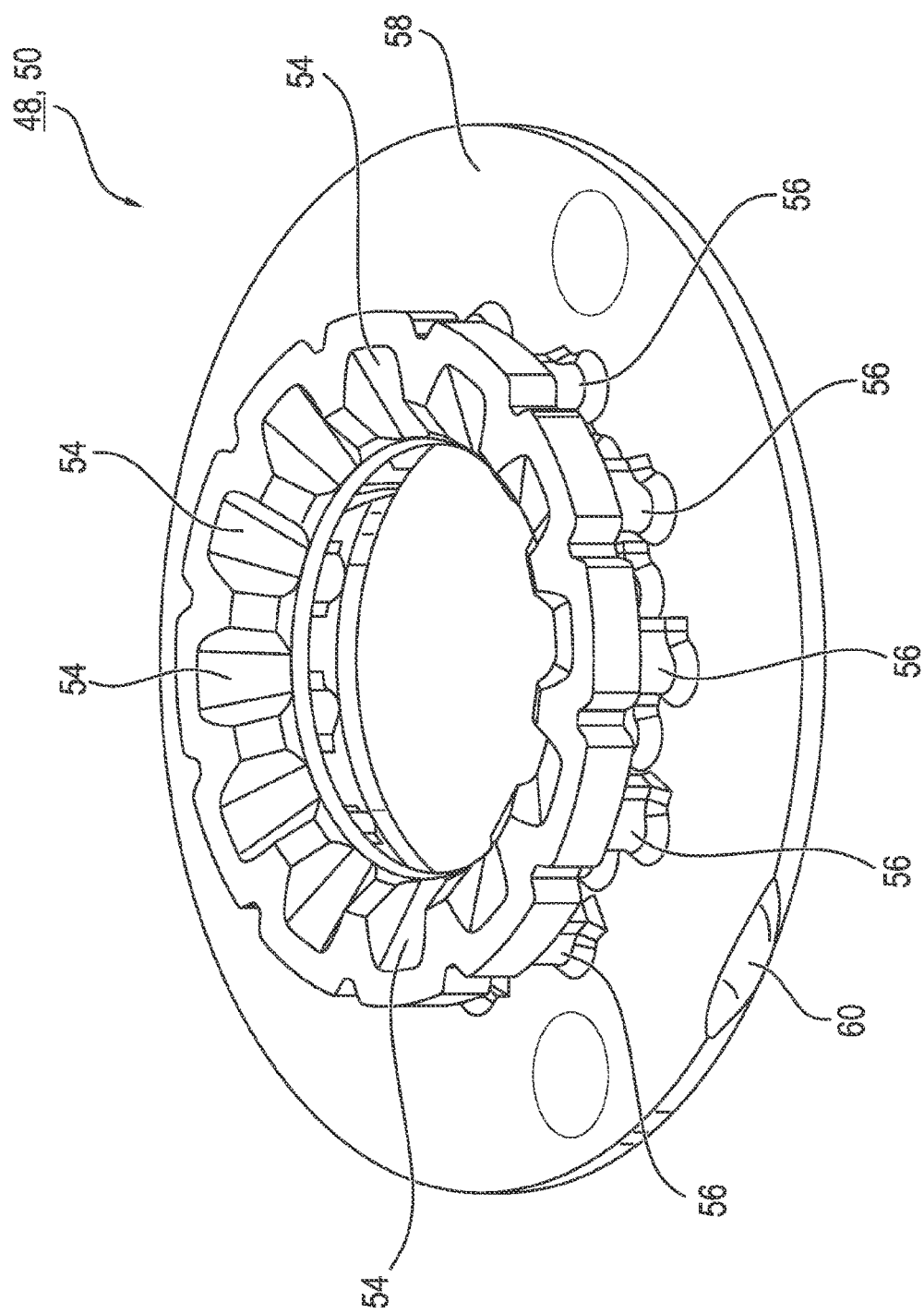
FIG. 11 is a perspective view of a potting of the stator.

In the assembled state, the cavity 44 is filled with potting 48 consisting of an electrically insulating potting material 50 (FIG. 10 and FIG. 11).

In the following text, the production of the stator 2 is explained in greater detail on the basis of FIGS. 8 to 11.

The stator stack 4 is fitted with the twelve coils 10. Subsequently, the interconnection ring 18 of the contact apparatus 12 is placed on top. Here, the coil ends 14 are guided axially through the leadthrough openings 34, and are contacted with the associated contact tabs 36 (FIG. 7).

After this, the ring cover 22 is placed onto the contacted coil ends 14 and contact tabs 36. Subsequently, the stator 2 is rotated in such a way that the stator end side which is provided with the contact apparatus 12 faces a substrate. Subsequently, the potting material 50 is filled into the cavity 44 via the leadthrough openings 34.

Figure 9:
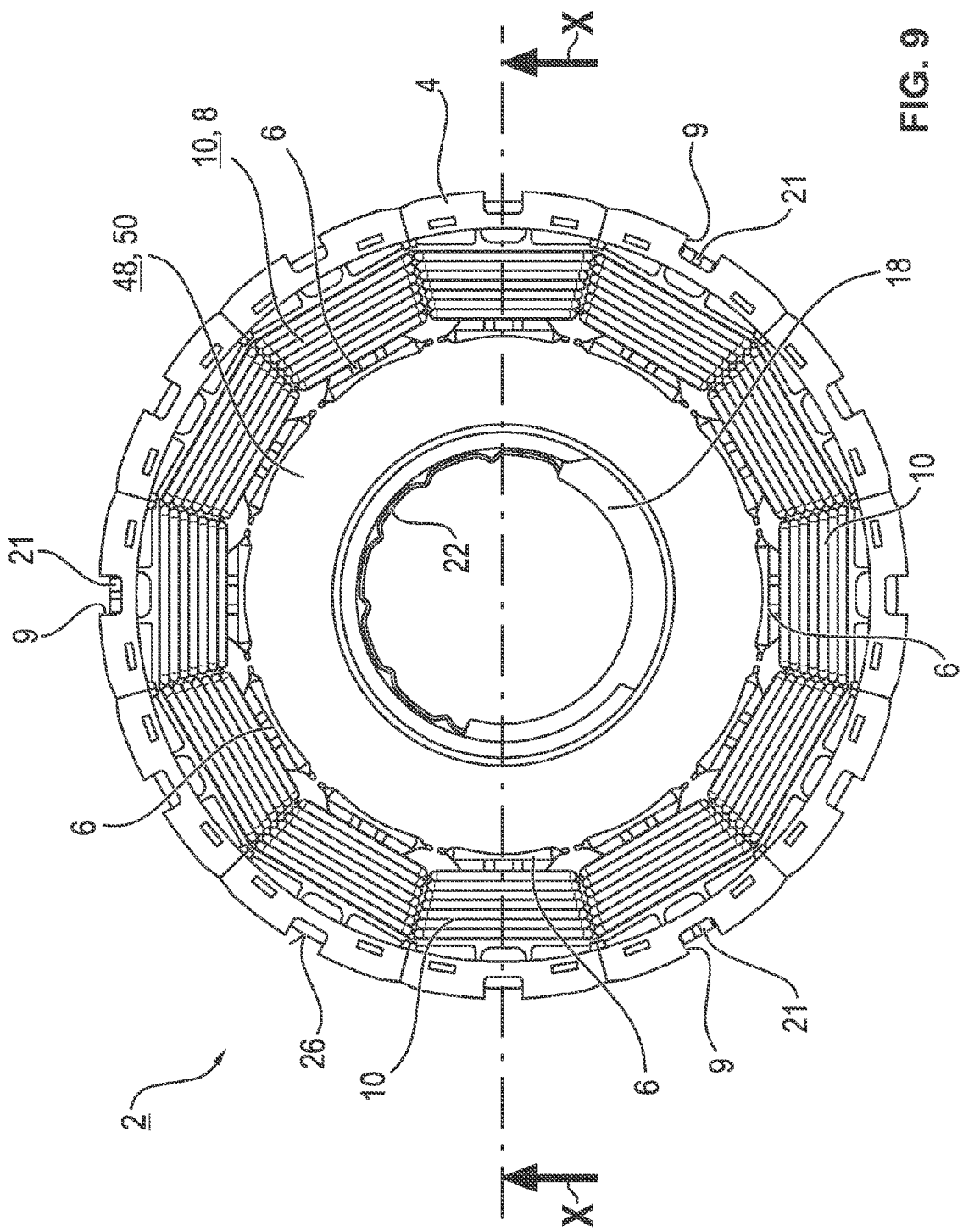
FIG. 9 is a top view of the stator with a view of an underside of the contact apparatus with a potting material.

Here, the cavity 44 is filled completely with the potting material 50, the potting material 50 being distributed completely in the cavity 44 due to gravity. In particular, here, the axial leadthrough openings 34 are also filled completely with potting material 50. As can be seen in FIG. 10, in particular, the potting material 50 is filled as far as the region of a winding head 52 of the coils 10. This means that the potting material 50 substantially completely covers the underside (shown in FIG. 8) of the interconnection ring 18 (FIG. 9). Finally, the potting material 50 is hardened to form the potting 48.

FIG. 11 shows exposed potting 48. The single-piece, that is to say single-part or monolithic, potting 48 is substantially a cast or a molding of the cavity 44, of the leadthrough openings 34 and of the underside of the interconnection ring 12. Here, the potting 48 correspondingly has a molding casting region 54 of the ramps 30 of the ring cover 22, and an axial casting region 56 which molds the leadthrough openings 34. A plate-shaped casting region 58 which depicts the underside of the interconnection ring 18 is molded onto the casting region 56. Here, the casting region 58 has a curved depression 60 radially on the outer side on account of the deflection region 24.

The invention is not restricted to the above-described exemplary embodiment. Rather, other variants of the invention can be derived herefrom by a person skilled in the art, without departing from the subject matter of the invention. In particular, furthermore, all the individual features described in conjunction with the exemplary embodiment can also be combined with one another in a different way, without departing from the subject matter of the invention.

The following is a summary list of reference numerals and the corresponding structure used in the above description of the invention:

LIST OF DESIGNATIONS

2 Stator
4 Stator stack
6 Stator tooth
8 Stator winding
9 Groove
10 Coil
12 Contact apparatus
14 Coil end
16 Phase connector
18 Interconnection ring
20 Plated-through hole
21 Latching tongue
22 Ring cover
23 Busbar
24 Deflection region
26 Outer circumference
28 Deflection contour
30 Ramp
32 Ring opening
34 Leadthrough opening
36 Contact tab
38 Latching tongue
40 Outer circumference
41 Latching receptacle
42 Projection
43 Receiving contour
44 Cavity
45, 46 Annular seal
48 Potting
50 Potting material
52,54,56,58 Casting region
60 Curved depression

The invention claimed is:

1. A stator of an electric motor, the stator comprising:
a stator stack having a plurality of stator teeth and coils disposed on said stator teeth defining a multiphase stator winding;
a plurality of phase connectors;
a contact apparatus for interconnecting axially directed coil ends of said coils with said plurality of phase connectors, said contact apparatus having an interconnection ring placed onto said stator stack on an end side and integrated busbars for interconnecting said coils with said plurality of phase connectors, said contact apparatus further having a ring cover disposed onto said interconnection ring and contact tabs, said contact apparatus further defined by:
said interconnection ring having a plurality of axial leadthrough openings formed therein corresponding to a number of said coil ends, and through said axial leadthrough openings said coil ends are led through perpendicularly;
said integrated busbars disposed on said end side with said contact tabs and disposed in a region of said axial leadthrough openings, and to each of said contact tabs one of said coil ends is contacted;

said ring cover covering said coil ends and said contact tabs; and said ring cover and said interconnection ring defining a cavity therebetween, said cavity filled with an electrically insulating potting material.

2. The stator according to claim 1, wherein said ring cover is joined in a form-locking and/or force-locking manner to said interconnection ring.

3. The stator according to claim 1, wherein:

said interconnection ring having latching receptacles; and said ring cover has a plurality of latching tongues which project radially from an outer circumference of said ring cover and are joined to corresponding ones of said latching receptacles of said interconnection ring.

4. The stator according to claim 1, wherein said cavity is sealed in a fluid-tight manner.

5. The stator according to claim 1, wherein said ring cover has two annular seals and said cavity is sealed in a fluid-tight manner by means of said two annular seals of said ring cover with respect to said interconnection ring.

6. The stator according to claim 1, wherein:

said contact apparatus has a central ring opening formed therein; and said ring cover has at least one deflection contour which conducts a fluid which flows into said central ring opening of said contact apparatus being part of a refrigerant drive.

7. The stator according to claim 6, wherein said deflection contour is formed as a plurality of ramps which are directed radially, open axially toward said central ring opening, and which are integrally formed on said ring cover radially on an inner side.

8. An electric motor, comprising:

said stator according to claim 1.

9. A refrigerant drive of a motor vehicle, comprising:

an electric motor having said stator according to claim 1.

10. A method for producing a stator, which comprises the steps of:

placing an interconnection ring of a contact apparatus onto a stator stack on an end side;

coil ends of a stator winding being guided axially through leadthrough openings of the interconnection ring and being contacted to contact tabs;

placing a ring cover of the contact apparatus onto the interconnection ring; and filling a cavity, which is configured between the ring cover and the interconnection ring, with an electrically insulating potting material.

* * * * *